United States Patent
Foskey (10) Patent No.: US 10,787,251 B2
(45) Date of Patent: Sep. 29, 2020

(54) VARIABLE SWEEP ROTORCRAFT BLADE TIP

(71) Applicant: Bell Helicopter Textron Inc., Fort Worth, TX (US)

(72) Inventor: Christopher Edward Foskey, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 15/871,002

(22) Filed: Jan. 14, 2018

(65) Prior Publication Data

US 2018/0257767 A1    Sep. 13, 2018

Related U.S. Application Data (60) Provisional application No. 62/468,342, filed on Mar. 7, 2017.

(51) Int. Cl.
| | |
|---|---|
| *B64C 27/46* | (2006.01) |
| *B64C 27/473* | (2006.01) |
| *B64C 27/37* | (2006.01) |
| *B64C 27/39* | (2006.01) |

(52) U.S. Cl.
CPC ............ *B64C 27/463* (2013.01); *B64C 27/37* (2013.01); *B64C 27/39* (2013.01); *B64C 27/473* (2013.01)

(58) Field of Classification Search
CPC ....... B64C 27/463; B64C 27/37; B64C 27/39; B64C 27/473; B64C 27/467; B64C 27/50; F05D 2240/307
See application file for complete search history.

(56) References Cited

U.S. PATENT DOCUMENTS

| | | | |
|---|---|---|---|
| 2,451,541 A | 10/1948 | Doman | |
| 3,005,496 A | 10/1961 | Nichols | |
| 3,814,351 A | 6/1974 | Bielawa | |
| 6,394,397 B1 | 5/2002 | Ngo et al. | |
| 2010/0162565 A1* | 7/2010 | Mukherji | B23P 6/00 29/889.1 |
| 2012/0261518 A1* | 10/2012 | Brewer | B64C 3/58 244/215 |
| 2013/0292508 A1* | 11/2013 | Fox | B64C 3/56 244/49 |
| 2015/0360773 A1 | 12/2015 | Allen | |
| 2016/0075430 A1 | 3/2016 | Foskey et al. | |

(Continued)

FOREIGN PATENT DOCUMENTS

| | | |
|---|---|---|
| DE | 1134593 B | 8/1962 |
| EP | 1127786 A1 | 8/2001 |
| EP | 2740663 A1 | 6/2014 |

(Continued)

OTHER PUBLICATIONS

Machine generated English translation of JPH04176795 A.*

(Continued)

*Primary Examiner* — Woody A Lee, Jr.
(74) *Attorney, Agent, or Firm* — Lightfoot & Alford PLLC (57) ABSTRACT

A helicopter has a mast axis and a rotorcraft blade assembly. The rotorcraft blade assembly has a main body and a blade tip movable relative to the main body. The rotorcraft blade assembly is selectively rotatable about the mast axis.

9 Claims, 9 Drawing Sheets

(56) References Cited

U.S. PATENT DOCUMENTS

2017/0073068 A1* 3/2017 D' Anna .................. B64C 27/50
2018/0002038 A1* 1/2018 Littlejohn ............. B64C 27/473

FOREIGN PATENT DOCUMENTS

| EP | 3293112 A1 | 3/2018 | | |
|---|---|---|---|---|
| FR | 817657 A | 9/1937 | | |
| JP | H0481391 A | 3/1992 | | |
| JP | H04176795 A | * 6/1992 | ............. | B64C 27/46 |
| JP | H05694 A | 1/1993 | | |
| KR | 20100111983 A | 10/2010 | | |
| WO | 2006098749 A1 | 9/2006 | | |

OTHER PUBLICATIONS

European Search Report in related European Patent Application No. 18157737.0, dated Jun. 20, 2018, 6 pages.
European Exam Report in related European Patent Application No. 18157737.0, dated Jul. 13, 2018, 19 pages.

* cited by examiner

VARIABLE SWEEP ROTORCRAFT BLADE TIP

CROSS-REFERENCE TO RELATED APPLICATIONS

This patent application claims the benefit of the filing date of U.S. Provisional Patent Application Ser. No. 62/468,342, filed on 7 Mar. 2017 and entitled "VARIABLE SWEEP ROTORCRAFT BLADE TIP," the entire content of which is hereby expressly incorporated by reference.

STATEMENT REGARDING FEDERALLY SPONSORED RESEARCH OR DEVELOPMENT

Not applicable.

BACKGROUND

Most helicopters comprise rotor blades that have conventional fixed blade tips that may be optimized for a specific tip speed or relatively small range of tip speeds.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Most generally, embodiments disclosed herein provide a reconfigurable blade tip that allows adjustment of a tip angle relative to a main blade body during flight so that the blade can be optimized for a particular flight speed and/or flight regime. Accordingly, a tip Mach number can be managed while in flight to accommodate a desired speed range or flight envelope. In some embodiments, the blade tip can be retracted toward a fully retracted position to reduce tip Mach numbers. By changing the blade tip position, tip shockwaves and tip vortexes can be managed, in some cases, to reduce the compressible waves at the blade tip.

Referring to FIGS. 1-8, a rotorcraft blade assembly 100 is shown as comprising a main body 102 and a blade tip 104 that is selectively movable relative to the main body 102. Most generally, the main body 102 comprises a leading blade profile 106 and a trailing blade profile 108. Similarly, the blade tip 104 comprises a leading tip profile 110 and a trailing tip profile 112. The rotorcraft blade assembly 100 comprises a structural spar 114 that serves as a primary path for centrifugal force acting on the rotorcraft blade assembly 100. In this embodiment, the spar 114 comprises a tubular structure that is constructed of composite materials. In alternative embodiments, a spar may be substantially solid. In other embodiments, spar may be constructed of materials other than composite material, such as, but no limited to, metals. The spar 114 serves as a primary structural element for the main body 102.

The rotorcraft blade assembly 100 further comprises a linear motor 116 fixed relative to the main body 102. In this embodiment, the linear motor 116 is attached to the spar 114. The linear motor 116 is configured to push and/or pull an input rod 118 in directions generally along the length of the rotorcraft blade assembly 100. The input rod 118 is connected to a bellcrank 120 via an input pivot connection 119 to a crank arm 123 and the crank arm 123 is further connected to an output rod 122 via an output pivot connection 125. The crank arm 123 is pivotably secured relative to the main body 102 using a crank pin 121 or other suitable structure and the crank pin 121 is disposed between the input pivot connection 119 and the output pivot connection 125. Actuation of the linear motor 116 can selectively translate the input rod 118 along the length of the rotorcraft blade assembly 100 toward the bellcrank 120 to rotate the bellcrank 120 about the crank pin 121 and resultantly translate the output rod 122 along the length of the rotorcraft blade assembly 100 toward the linear motor 116. In response to the input rod 118 being moved toward the bellcrank 120 and the output rod 122 being moved toward the linear motor 116, the blade tip 104 is urged toward a relatively more retracted position and/or to a fully retracted position, the fully retracted position being shown in FIGS. 2, 4, and 8. In some cases, the bellcrank 120 can be configured to provide a change in mechanical advantage by providing different spacing between the input pivot connection 119 and the crank pin 121 as compared to the spacing between the crank pin 121 and the output pivot connection 125.

To achieve an opposite movement of the blade tip 104, the linear motor 116 can be actuated to selectively translate the input rod 118 along the length of the rotorcraft blade assembly 100 toward the linear motor 116 to rotate the bellcrank 120 about the crank pin 121 and resultantly translate the output rod 122 along the length of the rotorcraft blade assembly 100 away from the linear motor 116. In response to the input rod 118 being moved toward the linear motor 116, the blade tip 104 is urged toward a relatively more extended position and/or to a fully extended position, the fully extended position being shown in FIGS. 1, 3, 5, and 7. The output rod 122 is connected to the blade tip 104 via a tip pivot connection 127. Each of the input pivot connection 119, output pivot connection 125, and tip pivot connection 127 can be achieved by utilizing pins and forked rod end connectors.

Because the blade tip 104 is movably connected to the main body 102 utilizing a pin 124 and/or associated bearings and/or bushings, operation of the linear motor 116 disposed near a center of gravity of the rotorcraft blade assembly 100 can cause rotation of the blade tip 104 about a central axis 131 of the pin 124. In some embodiments, the pin 124 extends through the spar 114, the blade tip 104 and outer skin 126 of the main body 102. In some embodiments, the outer skin 126 may be configured to lay over the pin 124. In this embodiment, the pin 124 extends through an upper aperture 132 of the spar 114 and through a lower aperture 134 of the spar 114, with the pin 124, the upper aperture 132, and the lower aperture 134 being substantially coaxially disposed with the central axis 131.

Some rotorcraft blades comprise complicated shapes along their leading edges. Accordingly, some blade tips contemplated by this disclosure comprise an at least partially torus-shaped leading tip profile so that although blade tip is rotated about the pin, the clearance and/or type of contact between the blade tip and the main body remains substantially constant. In this embodiment, the leading tip profile 110 remains in contact with the main body 102, namely, at least partially nested behind leading blade profile 106. Accordingly, although the blade tip 104 is movable, the rotorcraft blade assembly 100 comprises consistently faired leading surfaces and/or surface transitions. In operation, the rotorcraft blade assembly 100 can be rotated about a mast axis of a helicopter and during such rotation about the mast axis, the blade tip 104 can be moved relative to the main body 102.

In some embodiments, the blade tip is received inside the main body and/or is nested relative to the main body to be offset and/or complementary to the main body. In some embodiments, the trailing blade profile is configured so that the outer skin 126 of the main body is not sealed near the blade tip so that the blade tip 104 can be slid between the upper and lower portions of the outer skin 126. In some embodiments, the outer skin 126 can comprise as few as three to six plies of composite material and can be about fifty thousandths of an inch thick. In some cases, drag, vibration, and noise can be managed and/or reduced by moving the blade tip 104 relative to the main body 102.

Figure 1:
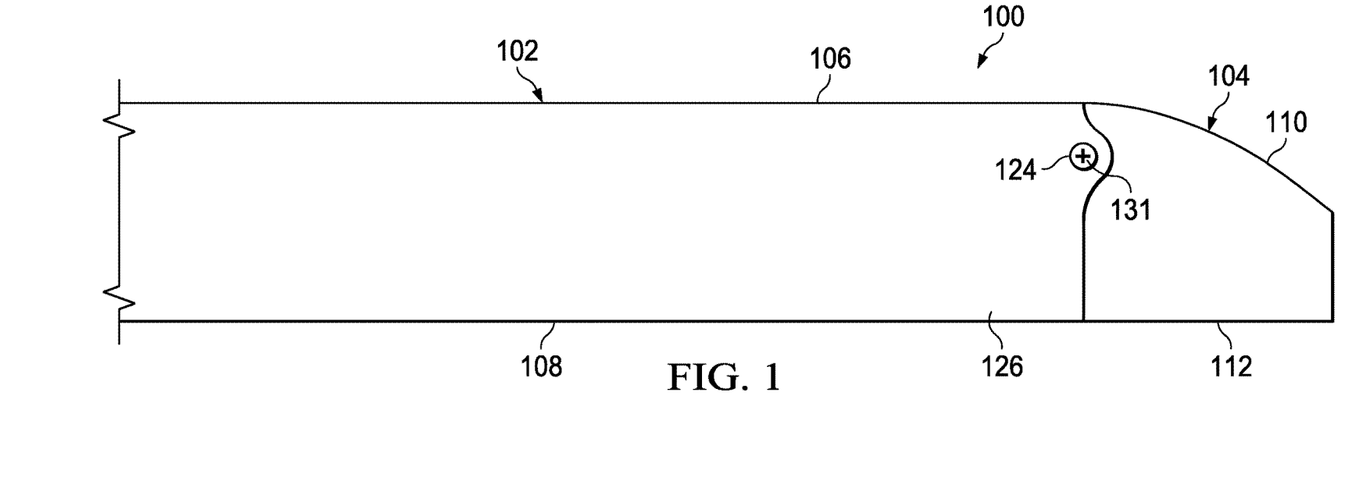
FIG. 1 is a top view of a rotorcraft blade assembly with a blade tip in a fully extended configuration according to an embodiment of this disclosure.
Figure 2:
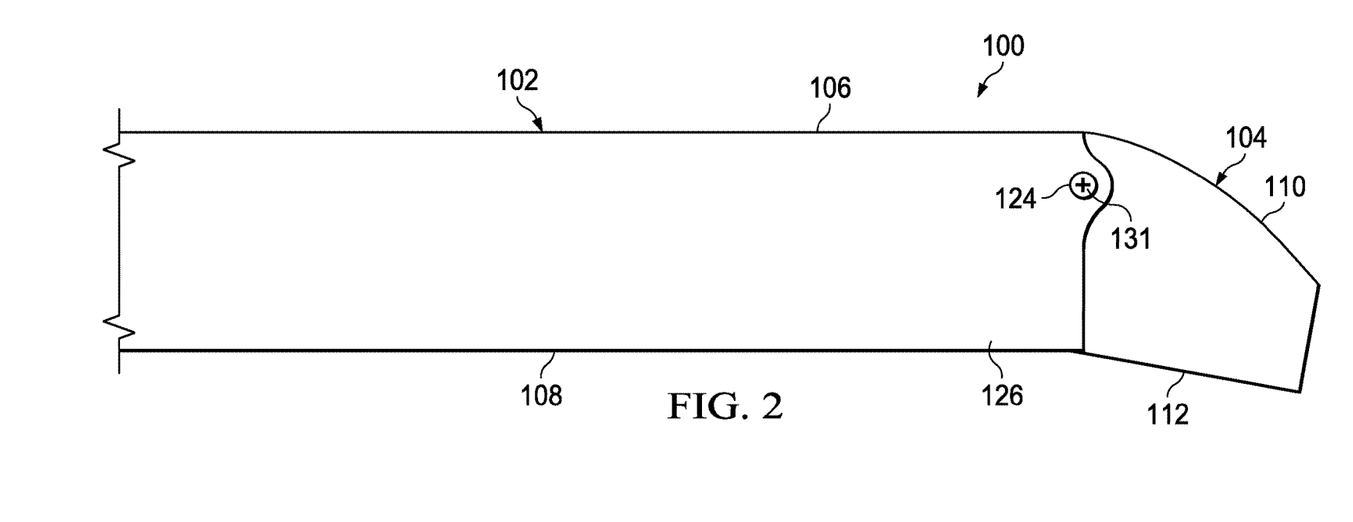
FIG. 2 is a top view of the rotorcraft blade assembly of FIG. 1 with the blade tip in a fully retracted configuration.
Figure 3:
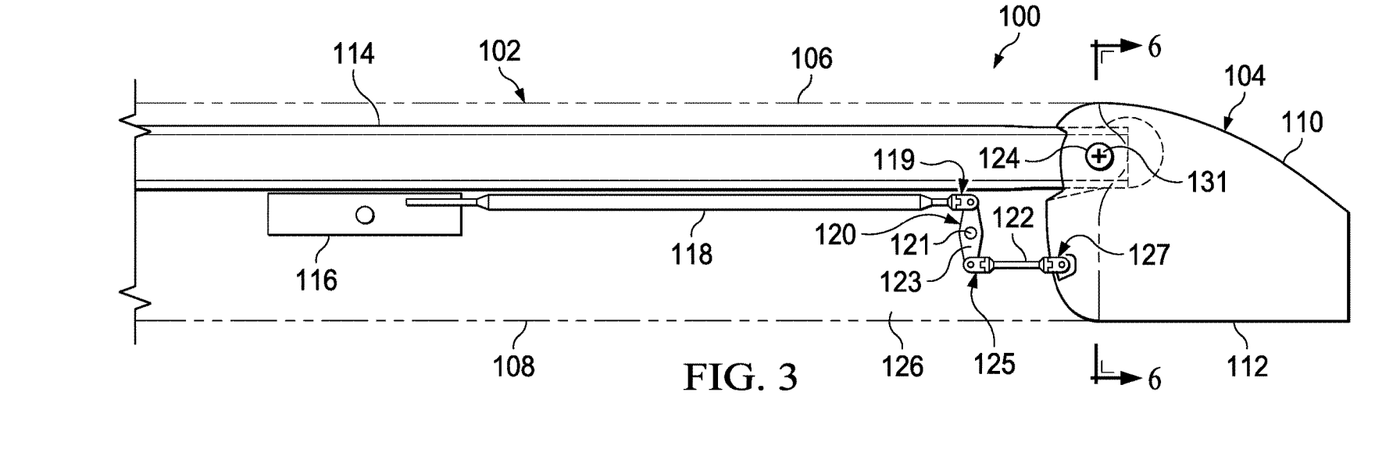
FIG. 3 is a top schematic view of the rotorcraft blade assembly of FIG. 1 with the blade tip in a fully extended configuration.
Figure 4:
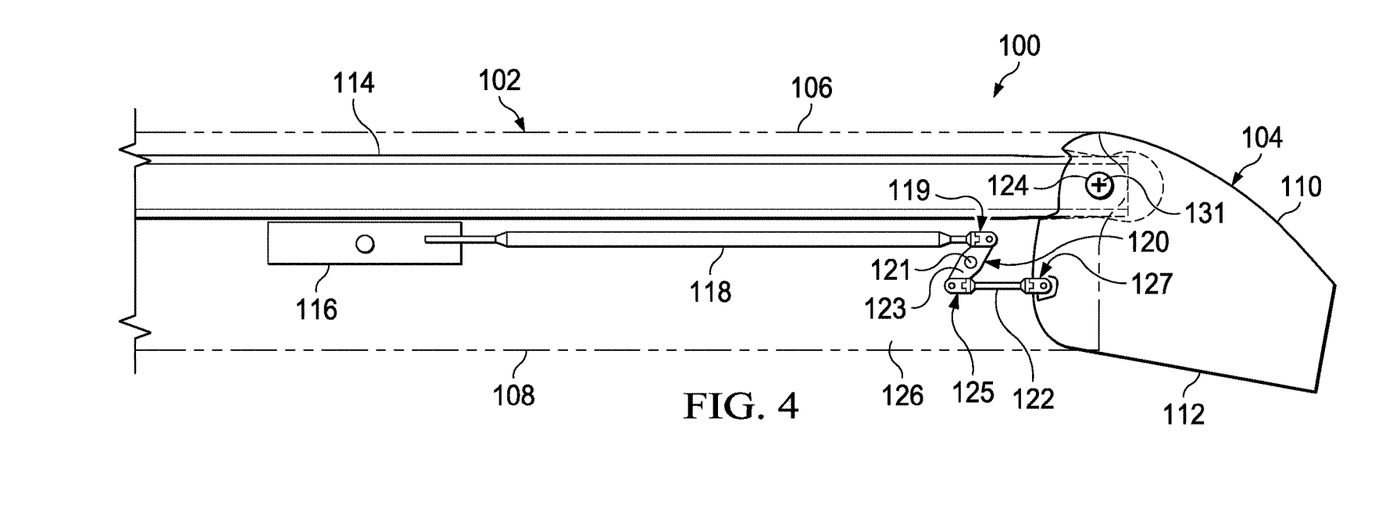
FIG. 4 is a top schematic view of the rotorcraft blade assembly of FIG. 1 with the blade tip in a fully retracted configuration.
Figure 5:
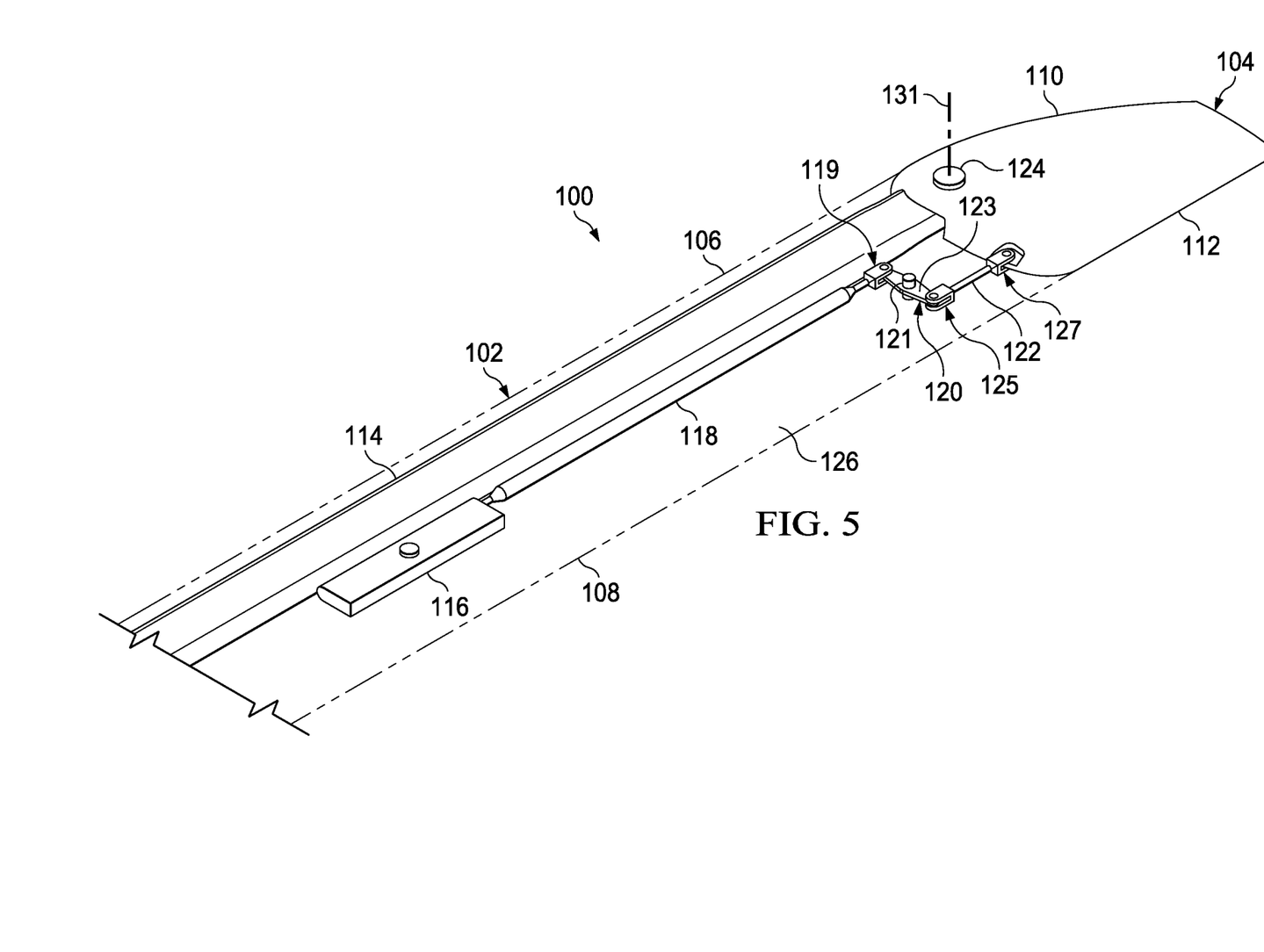
FIG. 5 is an oblique view of the rotorcraft blade assembly of FIG. 1 with the blade tip in a fully extended configuration.
Figure 6:
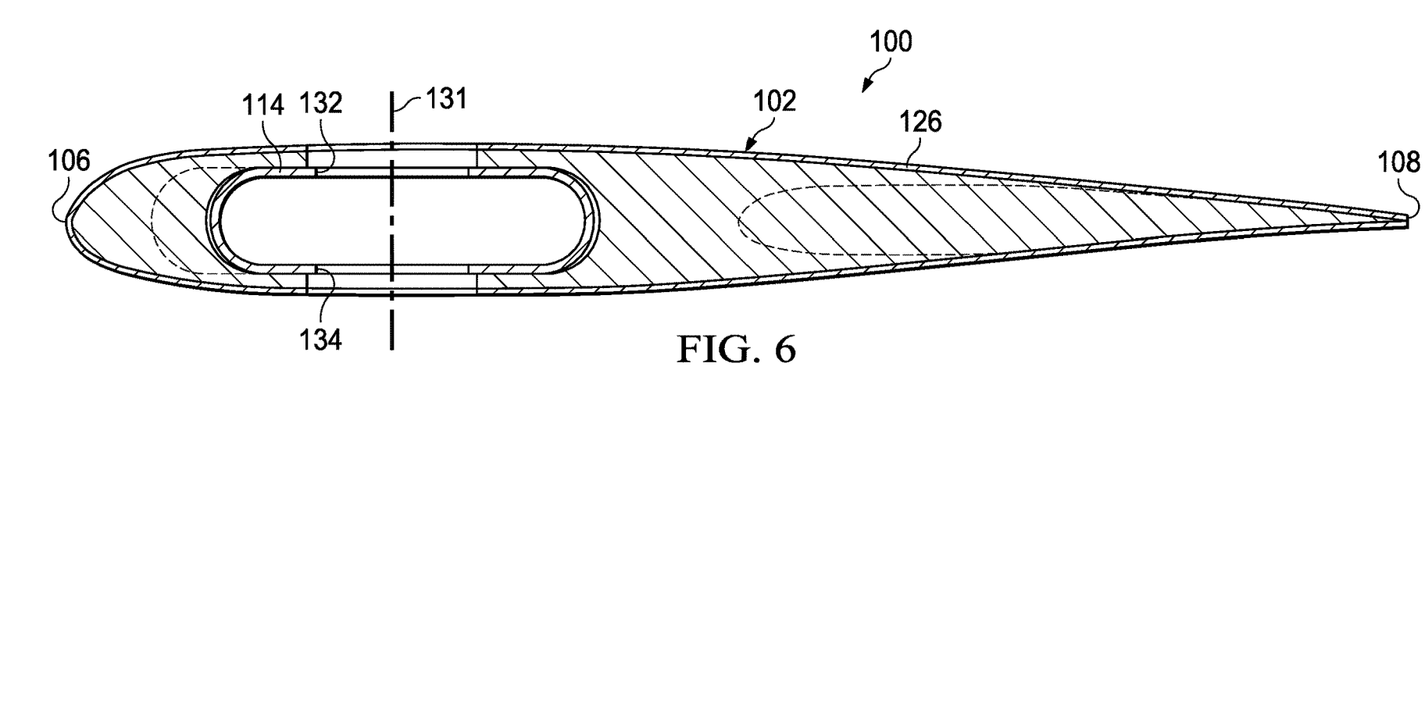
FIG. 6 is a cross-sectional view of the rotorcraft blade assembly taken along cutting line 6-6 of FIG. 3.
Figure 7:
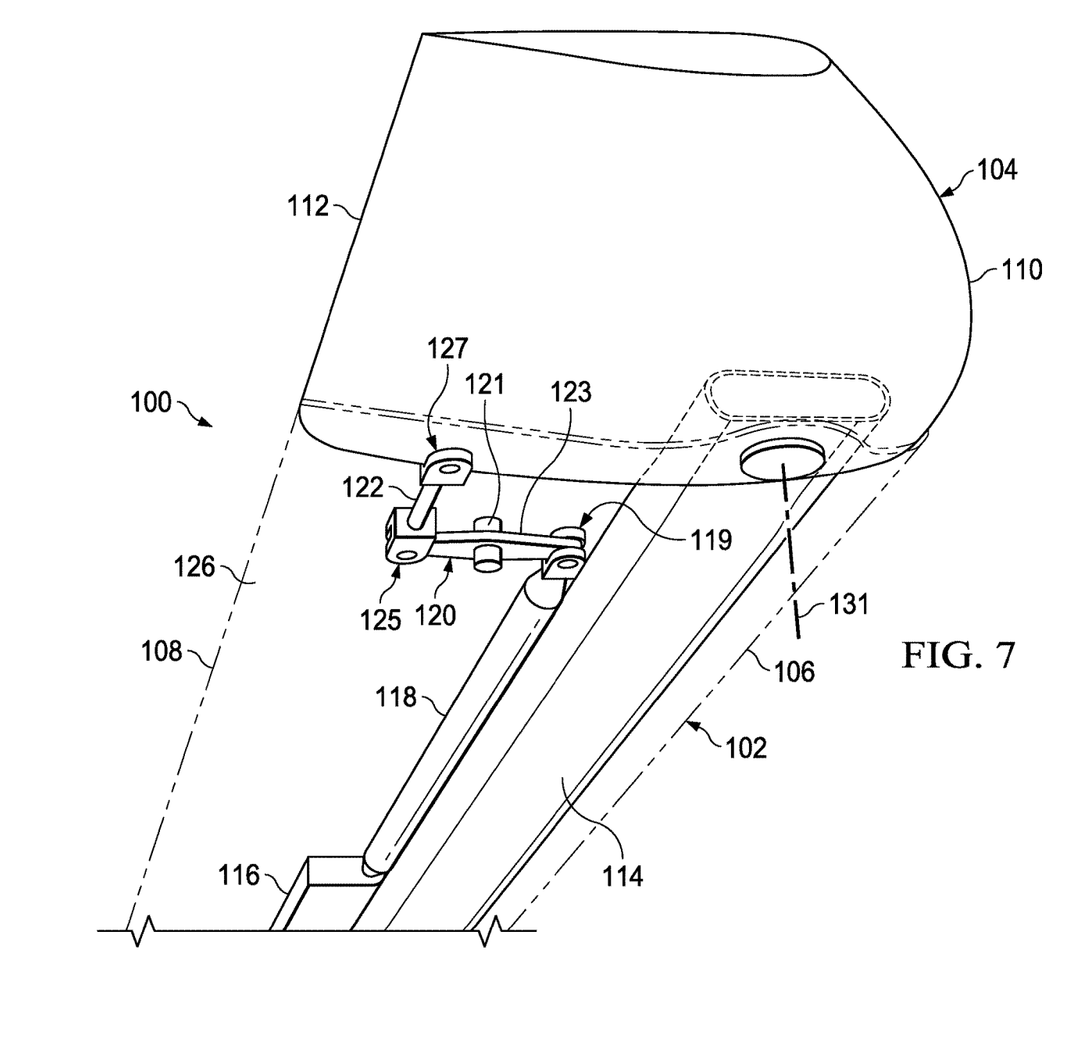
FIG. 7 is an oblique view of the rotorcraft blade assembly of FIG. 1 with the blade tip in a fully extended configuration.
Figure 8:
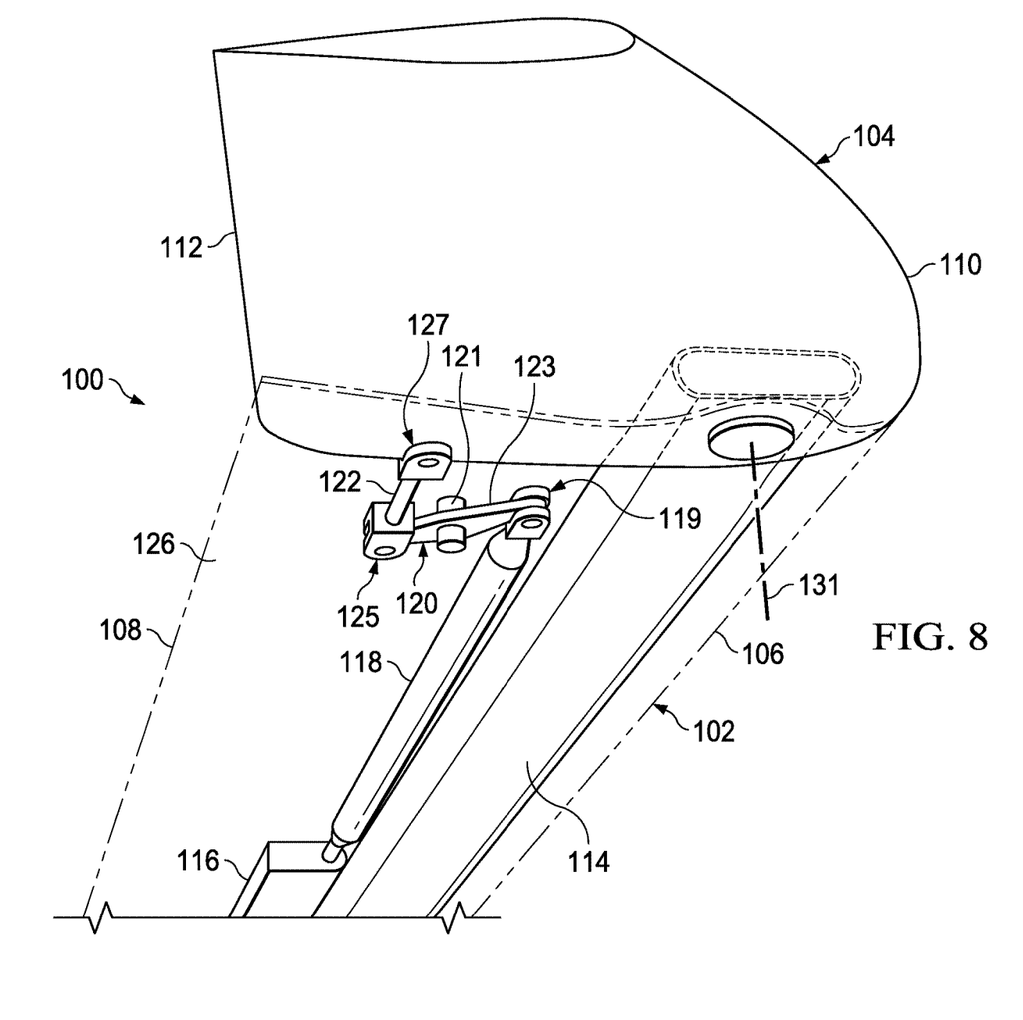
FIG. 8 is an oblique view of the rotorcraft blade assembly of FIG. 1 with the blade tip in a fully retracted configuration.
Figure 9:
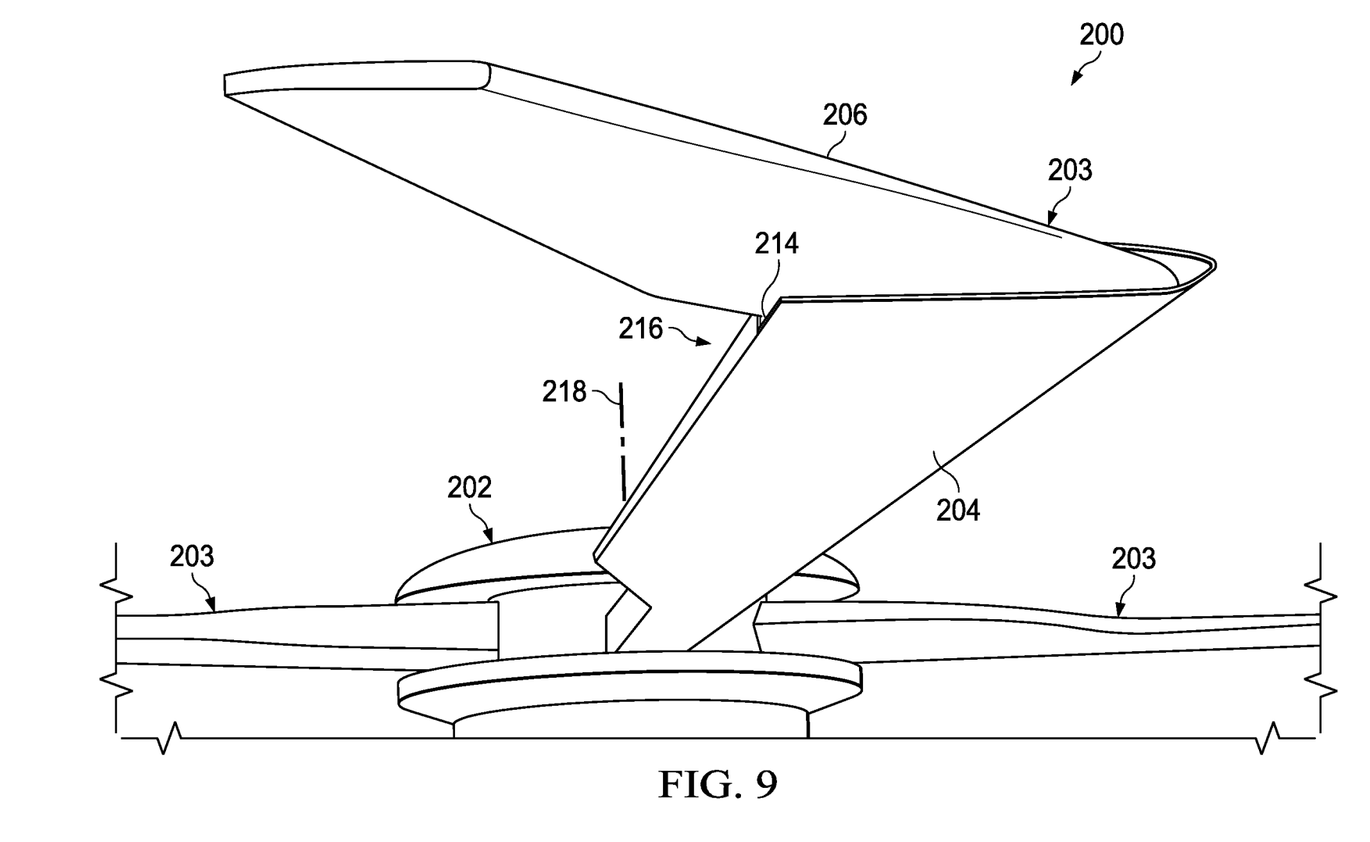
FIG. 9 is an oblique view of a helicopter comprising a rotorcraft blade assembly according to another embodiment.
Figure 10:
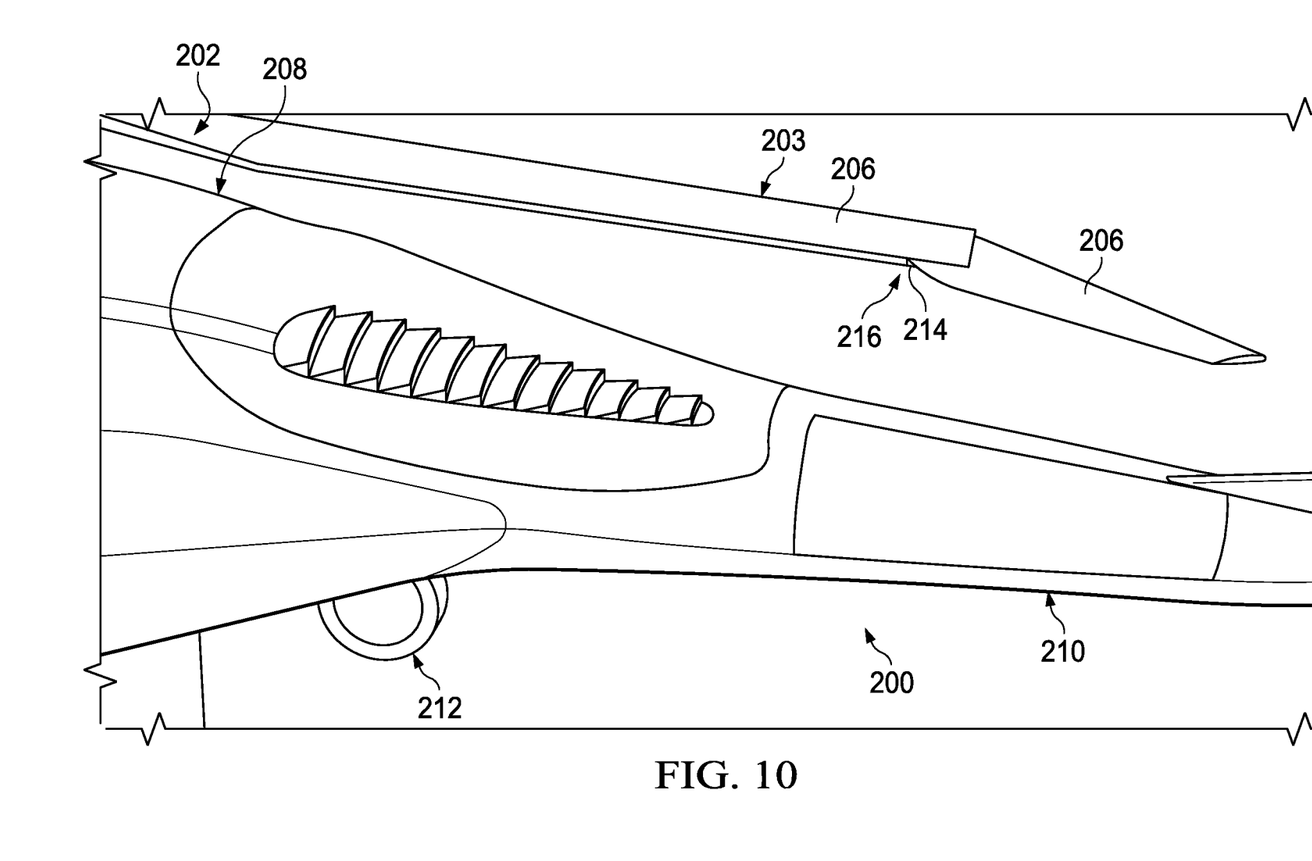
FIG. 10 is another oblique view of the helicopter of FIG. 9.

Referring now to FIGS. 9 and 10, a helicopter 200 is shown. Helicopter 200 comprises a rotor system 202 comprising a rotorcraft blade assembly 203, a fuselage 208, a tail 210, and landing gear 212. The rotorcraft blade assembly 203 comprises a main body 204 and a movable blade tip 206. The blade tip 206 is movable relative to the main body 204 in a substantially similar manner as blade tip 104 is movable relative to main body 102. However, in this embodiment, the blade tip 206 does not maintain contact with the main body 204 at the lengthwise end of the main body 204. A gap 214 is provided at a trailing blade profile 216 of the main body 204 into which gap 214 portions of the blade tip 206 may be selectively received. In this embodiment, a gap distance varies (as a function of an elasticity of the trailing blade profile 216) to accommodate any changes in thickness of the blade tip 206 received within the gap 214. In operation, the rotorcraft blade assemblies 203 can be rotated about a mast axis 218 of the helicopter 200 and during such rotation about the mast axis 218, the blade tip 206 can be moved relative to the main body 204.

Figure 11:
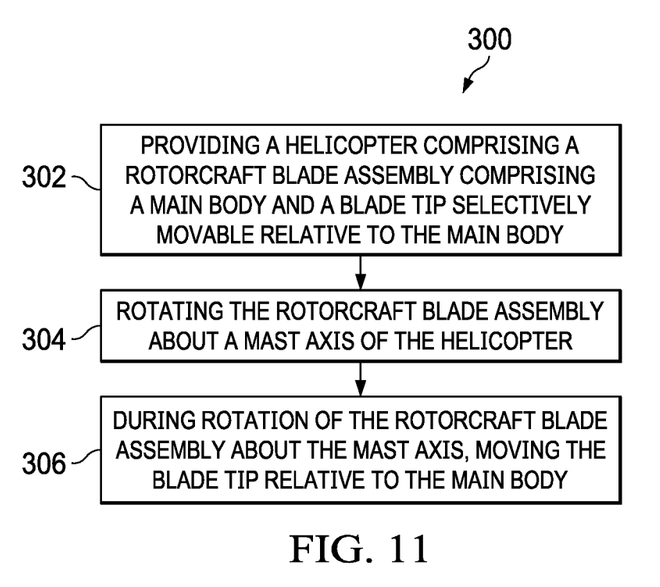
FIG. 11 is a flowchart of a method of operating a helicopter.

Referring now to FIG. 11, a flowchart of a method 300 of operating a helicopter (e.g., helicopter 200 or a helicopter comprising rotorcraft blade assembly 100) is shown. The method 300 begins at block 302 by providing a helicopter comprising a rotorcraft blade assembly (e.g., rotorcraft blade assemblies 100 or 203) comprising a main body (e.g., main body 102 or 204) and a blade tip (e.g., blade tip 104 or 206) selectively moveable relative to the main body. The method 300 continues at block 304 by rotating the rotorcraft blade assembly about a mast axis of the helicopter. The method 300 further continues at block 306 by, while rotating the rotorcraft blade assembly about the mast axis, selectively moving the blade tip relative to the main body. In alternative embodiments, a method of operating a helicopter may comprise moving the blade tip relative to the main body while the rotorcraft blade assembly is substantially stationary relative to the mast axis.

Explained another way, a variable-swept blade tip device and associated mechanism and interface layout for helicopter rotor blades is disclosed. A linear actuator can provide motive force to rotate a shaped blade tip about a pivot point through the main CF-bearing structural tube spar in the blade. A bellcrank or other mechanism allow actuation in the small volume afterbody of typical blades without locating the actuator in the same constrained space and maintaining a less severe CG shift. The blade tip is shaped to maintain contact on the leading edge through a sweep profile and blade trailing edge skins are flexible enough to allow the tip trailing edge to nest within the afterbody while maintaining contact with skin inner mold lines.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotorcraft blade assembly, comprising:
 a main body; and
 a blade tip movable relative to the main body about an axis perpendicular relative to the span of the main body;
 wherein the blade tip is connected to the main body using a pin that extends across and through a spar of the main body;
 wherein a leading tip profile of the blade tip is curved as viewed from above and is complementary to a leading blade profile of the rotorcraft blade assembly; and
 wherein a contact between the blade tip and each of the upper and lower portions of the outer skin of the main body is maintained throughout movement of the blade tip relative to the main body.

2. The rotorcraft blade assembly of claim 1, wherein the spar is tubular.

3. The rotorcraft blade assembly of claim 1, wherein movement of the blade tip relative to the main body is accomplished using at least one of a linear motor disposed within the main body and a bellcrank disposed within the main body.

4. The rotor blade assembly of claim 1, wherein a trailing blade profile is flexible and configured to receive a portion of the blade tip in a gap formed by the trailing blade profile.

5. A helicopter, comprising:
 a mast axis; and
 a rotorcraft blade assembly, comprising:
  a main body; and
  a blade tip movable relative to the main body about an axis perpendicular relative to the span of the main body;
  wherein the blade tip is connected to the main body using a pin that extends across and through a spar of the main body;
  wherein the rotorcraft blade assembly is selectively rotatable about the mast axis; and
  wherein a leading tip profile of the blade tip is curved as viewed from above and is complementary to a leading blade profile of the rotorcraft blade assembly; and
  wherein a contact between the blade tip and each of the upper and lower portions of the outer skin of the main body is maintained throughout movement of the blade tip relative to the main body.

6. The helicopter of claim 5, wherein the maintained contact comprises contact between the blade tip and a leading blade profile of the main body.

7. The helicopter of claim 5, wherein the maintained contact comprises contact between the blade tip and a trailing blade profile of the main body.

8. A method of operating a helicopter, comprising:
 providing a helicopter comprising:
  a rotorcraft blade assembly, comprising:
   a main body; and
   a blade tip that is selectively movable relative to the main body about an axis perpendicular relative to the span of the main body, wherein the blade tip is connected to the main body using a pin that extends across and through a spar of the main body; and
  moving the blade tip relative to the main body;
 wherein a leading tip profile of the blade tip is curved as viewed from above and is complementary to a leading blade profile of the rotorcraft blade assembly; and
 wherein a contact between the blade tip and each of the upper and lower portions of the outer skin of the main body is maintained throughout movement of the blade tip relative to the main body.

9. The method of claim 8, wherein the moving the blade tip relative to the main body is performed while rotating the rotorcraft blade assembly about a mast axis of the helicopter.

* * * * *